June 3, 1952 H. NYGAARD 2,598,716

MAGAZINE FOR MAGNETIC WIRE RECORDERS

Filed April 16, 1947 3 Sheets-Sheet 1

INVENTOR
HERMAN NYGAARD
BY
Pennie, Edmonds, Morton and Barrows
ATTORNEYS

MAGAZINE FOR MAGNETIC WIRE RECORDERS

Filed April 16, 1947 3 Sheets-Sheet 2

INVENTOR
HERMAN NYGAARD
BY
Pennie, Edmonds, Morton and Barrows
ATTORNEYS

June 3, 1952 H. NYGAARD 2,598,716

MAGAZINE FOR MAGNETIC WIRE RECORDERS

Filed April 16, 1947 3 Sheets-Sheet 3

INVENTOR
HERMAN NYGAARD
BY
Rennie, Edmonds, Morton and Barrows
ATTORNEYS

Patented June 3, 1952 2,598,716

UNITED STATES PATENT OFFICE 2,598,716

MAGAZINE FOR MAGNETIC WIRE RECORDERS

Herman Nygaard, Poughkeepsie, N. Y., assignor to Daystrom Electric Corporation, Poughkeepsie, N. Y., a corporation of Delaware Application April 16, 1947, Serial No. 741,885

7 Claims. (Cl. 242—158)

This invention relates to magnetic recorders, and particularly to recorders of the magazine type in which the wire recording medium is wound upon spools disposed in a substantially closed casing or magazine which is readily separable from the recorder unit. The recorder unit supports the magnetic head used for recording, play-back and erasing in position for association with the recording wire upon emplacement of the magazine on the recorder, and contains the necessary amplifying equipment and the mechanism which drives the spools.

Heretofore, the magazines proposed for such recorders have provided means therewithin for wholly or partially journaling the supply and take-up spools for rotation. Such a construction requires accurate machining and finishing in the manufacture of the magazines and increases their cost of manufacture. Such prior art magazines have not contained within themselves the necessary level-winding means for assuring even laying of the wire on the spools, so that the magazines were not instantly interchangeable without regard to the proportion of the wire on the two spools of the magazine and the relation thereof to the position of the level-winding mechanism on the recorder.

In accordance with the present invention, no exact positioning and supporting of the spools in the magazine is required. The magazine accordingly can be produced by relatively inexpensive production methods at minimized cost. The magazine of the present invention includes simple resilient means for holding the spools in approximately correct position and for locking them against undesired rotation. It is arranged for the entry of positioning and driving members from the recorder unit. These positioning and driving members control the rotation of the spools and determine exactly their axes of rotation and their position along these axes, without dependence on accurately finished bearings forming part of the magazine. Engagement of the magazine with the recorder unit automatically effects proper alignment of the recording wire with the magnetic head. It also engages a cam provided in the magazine for insuring level winding of the wire on the spools with a drive therefor on the recorder unit. The magazine is equipped with means driven by this cam insuring that the wire will be laid in level layers on the spools, irrespective of the direction of the travel thereof from one spool to the other in the process of recording, play-back, or rewinding.

The magazine structure includes a guide frame mounted on pivots within the magazine which is caused to oscillate about these pivots by the cam drive mentioned above. The guide frame in its oscillation lays the wire evenly on the spools and also controls its passage through guide pins in a fixed path for ready engagement with the magnetic head upon emplacement of the magazine on the recorder. The position of this path within the magazine is independent of the oscillation of the guide frame and of the quantity of wire wound on either of the spools. The position of this path with respect to the base plate of the magazine is the same for all magazines so that all magazines are instantly interchangeable on the recorder, and proper engagement of the recording wire with the magnetic head is always effected by the mere emplacement of the magazine on the recorder without manipulation of the wire. The guide frame affords resilient support which cushions the stresses which would normally be transmitted to the wire by sudden starting and stopping, or by reversing the direction of travel.

The guide frame is mounted in the magazine on a simple three-point suspension, consisting of two pivots and a cam follower through which the cam controls the oscillation of the guide frame about the pivotal axis. Magazines of different capacities differ in their internal structure only in the spool thickness and in the size of the cam required to lay the wire evenly on spools of different thicknesses.

The details of the present invention will now be further explained with reference to the accompanying drawings in which.

Figures 1, 2:
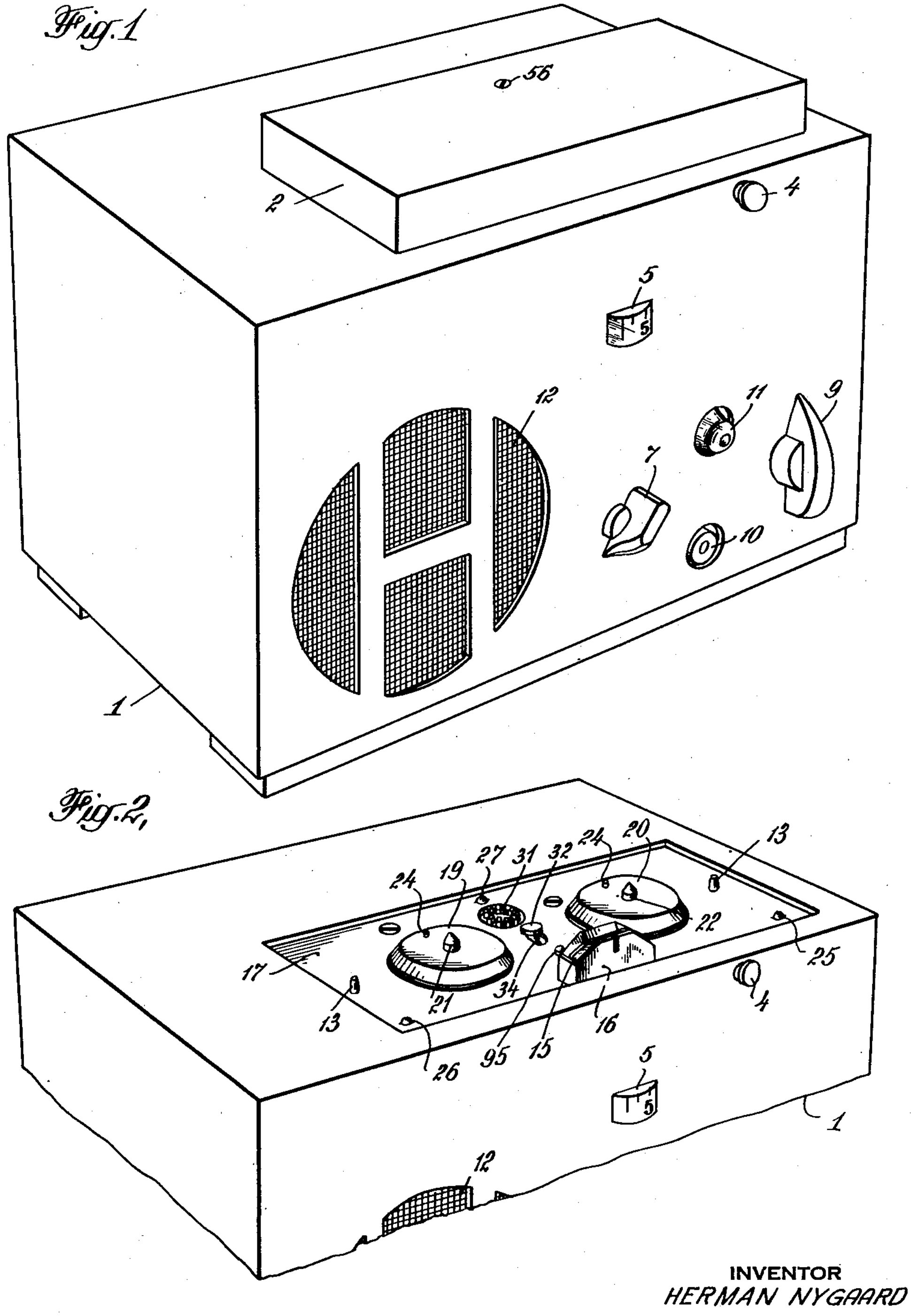
Fig. 1 is a perspective view showing the magazine in operative position relative to the recorder unit.
Fig. 2 is a perspective view of the top of the recorder unit, the magazine being removed to aid in illustrating the cooperative features of the recorder unit.

Referring now to Fig. 1 of the drawings, the recording and reproducing device 1 is a unit enclosure. The magazine 2 containing the paramagnetic wire recording medium is adapted to be separably disposed on the unit 1 as shown. A push button 4 is provided to actuate a release mechanism within the unit 1 when it is desired to remove the magazine 2. The fraction of the total recording time or length of wire remaining on the supply spool in the magazine is shown on an indicator 5. An on-off switch 7 is arranged to act also as a volume control, and is placed in a symmetrical grouping with a four-position control knob 9, a screw-plug type microphone connection 10, and a neon glow lamp indicator 11, which flashes whenever the amplitude of the sound received in the recorder is sufficient for proper recording. The control knob 9 sets the equipment for recording in the first position, for play-back in the second position, to neutral in the third position, and for rewinding in the fourth position. Erasing of unwanted recorded material from the wire is automatically effected during recording, as the wire is fed past an erasing electromagnet before reaching the electromagnet used for recording. A speaker used for reproduction is concealed behind a conventional grille 12. Power and monitoring connections, not visible in Fig. 1, are provided at the rear of the cabinet, together with an arrangement for the use of foot-pedal control for stopping and starting.

Changing of the magazine 2 is accomplished by pressing the release button 4, which allows the magazine to be lifted off the unit 1 and another to be put in its place. The unitary magnetic head 15 may then be seen as in Fig. 2, mounted in a protective head container 16, which is secured to, and extends upwardly from, the top chassis plate 17 of the recorder unit. Provision is made in the recorder unit 1 for supporting and driving the magazine spools 74 and 75 (seen in Fig. 3) by means of two frusto-conical positioning members 19 and 20, which extend above top chassis plate 17 symmetrically with respect to head 15. Tapered studs 21 and 22 protrude axially from positioning members 19 and 20, while a drive pin 24 extends upwardly near the circumference of each of these. Upon emplacement of the magazine on the recorder the position of the spools relative to the recorder is fixed; in height by the members 19 and 20, and in the location of their axes of rotation by the studs 21 and 22. The driving force which rotates the spools is transmitted through the pins 24.

A castellated drive member 31 also projects above top plate 17 rearwardly of head 15. It serves to drive the cam of the level-winding mechanism in the magazine, and is depressible against a spring so as to insure accommodation of and engagement with a drive pin on the camshaft, regardless of the angular relation of the latter to the drive member 31 when the magazine is first placed on the recorder unit. The drive pin on the end of the camshaft is shown at 35 in Fig. 5, recessed in base plate 36 of the magazine.

Between head 15 and the castellated drive member 31, a locking stud 32 rises through an elongated slot 34 in plate 17. Locking stud 32 is controlled, through mechanism not seen in the figure, by the release button 4. When the magazine 2 is in place, the locking stud 32 is engaged within a slot in the magazine base plate so as to maintain it in the proper position. This slot is shown at 37 in Fig. 5. It has a wide portion 39 through which locking stud 32 may pass upon emplacement of the magazine, when the release button 4 is pressed in. A spool lock releasing pin 95 protrudes upwardly from top chassis plate 17 between head 15 and locking stud 32. Pin 95, when the magazine is emplaced on the recorder unit, extends up through a bore 94 in magazine base plate 36 and into the magazine where it unlocks the spools so that they may rotate.

The magazine is aligned on the recorder unit by means of pins 13 protruding from the stop chassis plate 17 which mate with indexing holes 18 in the magazine base plate 36. To insure proper orientation of the magazine and the level winding guide frame therewithin with reference to the spools, which during operation are positioned by the members 19 and 20 and by the studs 21 and 22 in the recorder unit, the magazine is supported on the recorder unit by two bosses 25 and 26, underlying the bearings in the magazine in which the guide frame is pivoted, and by a boss 27 directly behind drive member 31.

Figures 3, 4, 5:
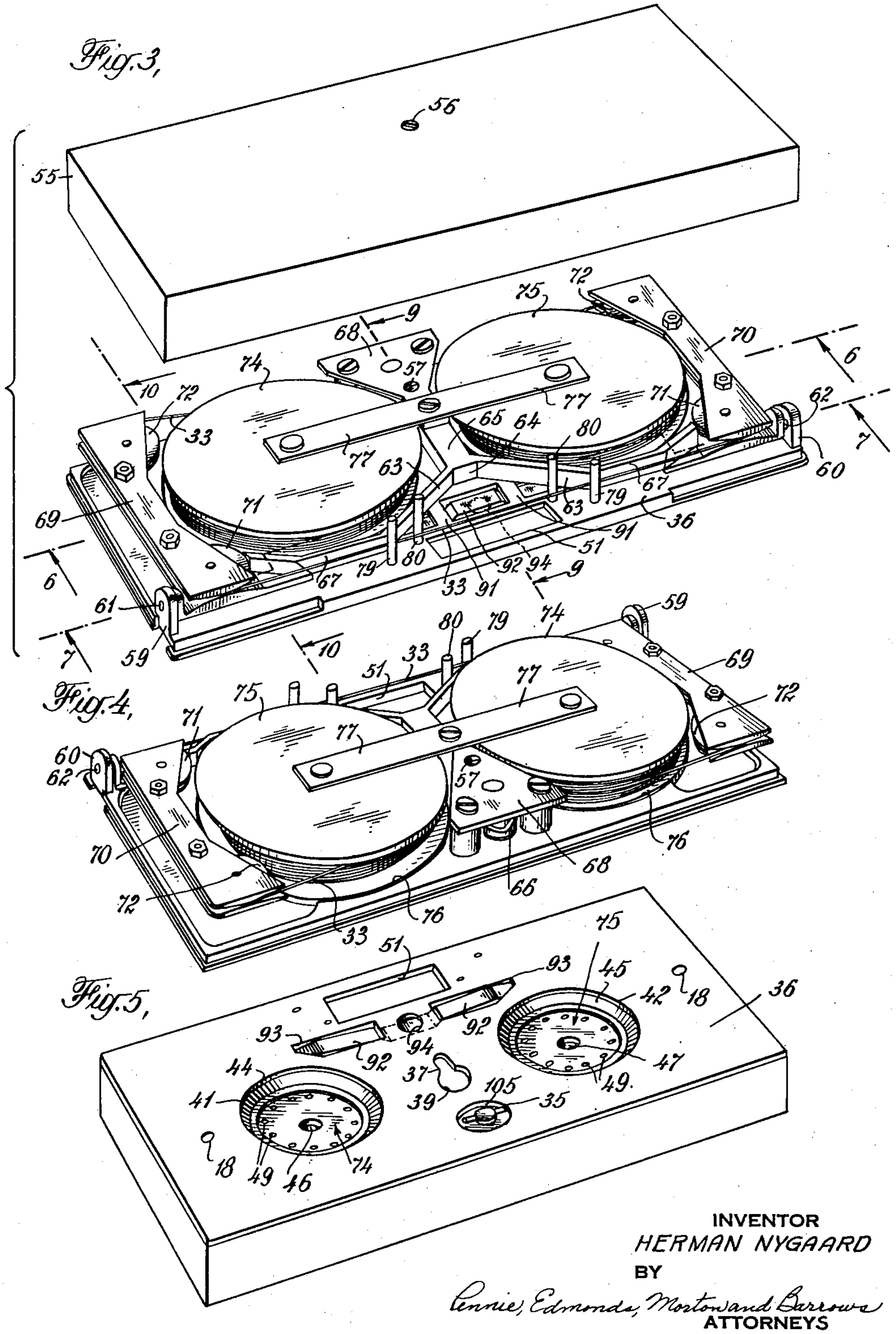
Fig. 3 is a front perspective view of the magazine with the cover displaced and with the movable parts thereof related as they are when the magazine is locked in position on the recorder unit.
Fig. 4 is a perspective view of the elements of the magazine taken from the rear with the cover removed illustrating the guiding mechanism for laying the wire smoothly and evenly on the reels or spools during winding and unwinding.
Fig. 5 is a perspective view of the underside of the magazine.

As seen in Fig. 5, the base plate 36 of the magazine is provided with two symmetrically disposed apertures 41 and 42 through which the frusto-conical positioning members 19 and 20 may enter to engage the corresponding frusto-conical recesses 44 and 45 in spools 74 and 75. The spool recesses are also provided with central bores 46 and 47 to receive studs 21 and 22, and have a plurality of circumferentially disposed drive bores 49 to receive drive pins 24. The base plate includes a recess 105 for the drive pin 35, the locking slot 37, indexing holes 18, and a head receiving aperture 51 through which the magnetic head 15 protrudes into the magazine for engagement with the recording wire. On either side of the spool lock releasing pin bore 94 and in line therewith, apertures 93 cut through the base plate 36 accommodate a spool locking spring member 92 below the lower surfaces of the spools, as will be explained below.

In Fig. 3 the magazine is shown from the front with its cover 55 displaced upwardly to expose the mechanism mounted upon the base plate 36. The corresponding view from the rear of the magazine structure is shown in Fig. 4. The cover 55 is normally held in position by a screw 56 which engages a threaded bore 57 in a cam housing plate 68 which is fixed relative to the base plate. The cover and base plate together constitute a casing for the magazine.

Spools 74 and 75 are loosely mounted within circular spool races 76 cut into base plate 36. They are resiliently retained in these races by spring arms 77 secured to the cam housing plate 68. The play allowed the spools within the magazine between the spring arms 77 and the cover 55 is never enough, however, to allow the spools to fall out of their races.

Brackets 59 and 60 are formed at the front of either end of base plate 36 in alignment with the head-receiving aperture 51. The brackets 59 and 60 receive pivot members 61 and 62, respectively, which carry a W-shaped guide frame generally indicated at 64. The central guide frame leg 65 carries a cam follower, described in detail below, which cooperates with a screw-type cam 66. Cam 66 has a right- and left-handed thread closed upon itself and is journaled at its lower end in the base plate 36, while its upper end is journaled in the cam housing plate 68. Wire guide arms or shoes 69 and 70, which have deeply grooved pulleys 71 and 72 mounted therein, are formed on and constitute the outer legs of the W-shaped guide frame 64, which is made sufficiently resilient at the junction between the diagonal portions 63 and the base portions 67 thereof to prevent sudden stresses from breaking the recording wire 33. This resiliency permits the rear ends of the guide shoes 69 and 70, away from the pivots 61 and 62, to bend toward each other and to relieve the stress on the wire. During operation of the equipment, cam 66 is rotated by drive member 31 in the recorder unit and the guide frame 64 oscillates up and down to carry the rear ends of the guide shoes 69 and 70 up and down the axial length of the spools. The speed of drive member 31 is so related to that of members 19 and 20 carrying drive pins 24 that the spools make a large number of revolutions during the time of one complete oscillation.

The paramagnetic recording wire 33 is threaded from spool 74 at the rear of the magazine around rear pulley 72 and front pulley 71 in guide shoe 69, between outer and inner guide pins 79 and 80 disposed at both ends of aperture 51, around front pulley 71 and rear pulley 72 in guide shoe 70, and back to spool 75. The guide shoes 69 and 70 and the pulleys 71 and 72 are deeply grooved so that the wire 33 will not become disengaged therefrom.

Figures 6, 7, 8, 9, 10:
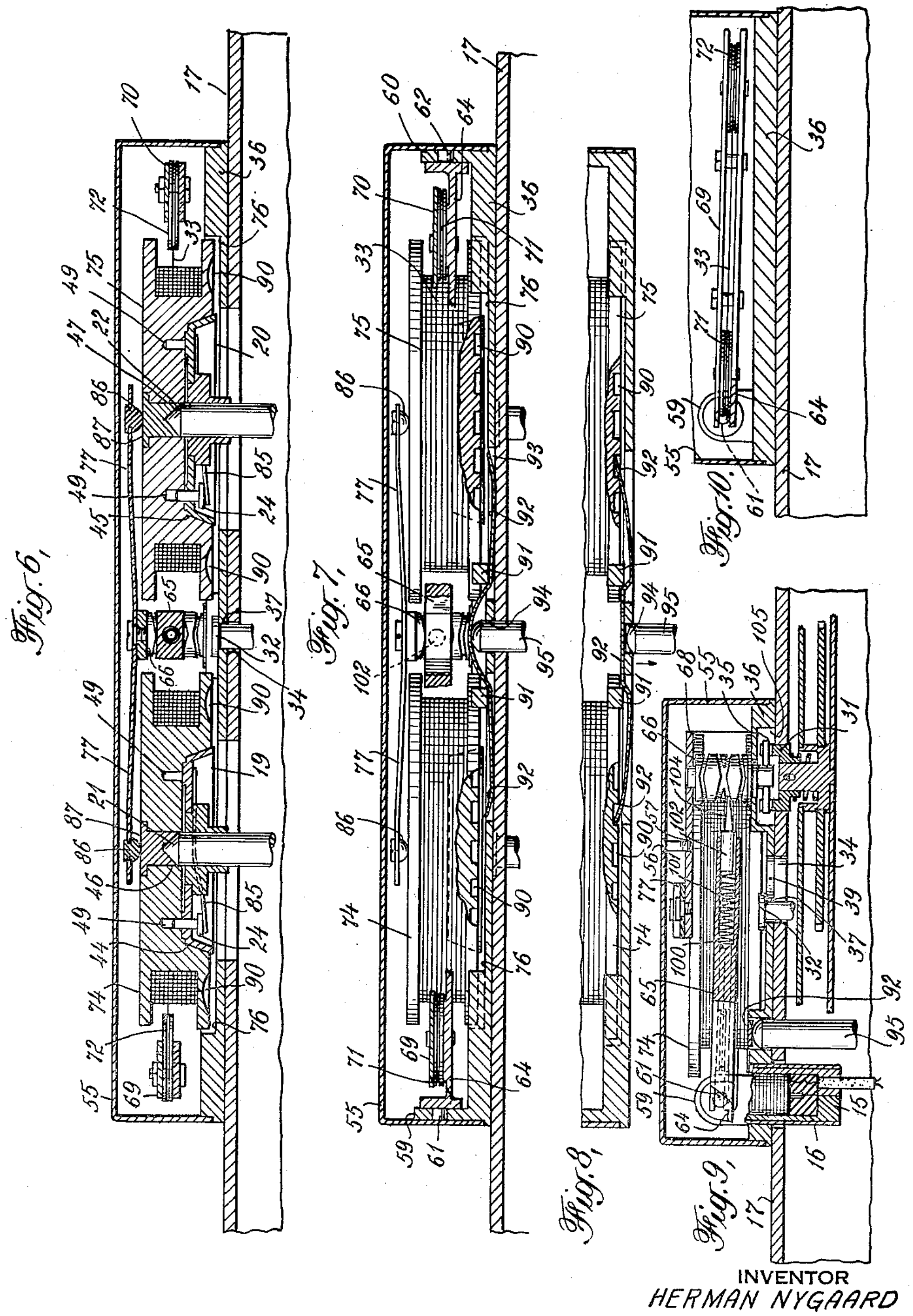
Fig. 6 is a longitudinal sectional view taken along line 6—6 of Fig. 3 showing the details of the spool drive and part of the guide mechanism which lays the wire.
Fig. 7 is a longitudinal sectional view taken along line 7—7 of Fig. 3 to show the spool locking means in released position and further details of the wire-laying mechanism.
Fig. 8 is a schematic view, partly in section, showing the spool-locking mechanism in locking position, the magazine being detached from the recorder.
Fig. 9 is a transverse sectional view, taken as indicated by line 9—9 in Fig. 3, to show the cam drive for operating the wire-laying means.
Fig. 10 is an end view of the wire-laying arms of the guide frame taken along line 10—10 of Fig. 3.

In Fig. 6 I have illustrated the magazine in a schematic sectional view to show the relation of the spools 74 and 75 to the positioning members 19 and 20 which extend into engagement therewith from the recorder unit 1. Frusto-conical recesses 44 and 45 are shown receiving the positioning members 19 and 20. Each of these members has a driving pin 24 extending resiliently therefrom under the influence of a spring 85, for engagement with one of the drive bores 49 formed in the spools in a circle within the recesses 44 and 45. It will be seen that the cooperation of the frusto-conical surfaces and the engagement of the studs 21 and 22 within the bores 46 and 47 will operate to position the spools 74 and 75 exactly during rotation without requiring the use of carefully machined or accurately positioned journal members within the magazine 2. The spools are lifted slightly within their races 76 by members 19 and 20, so that they have no contact with the magazine casing during rotation. Wear within the magazine is thus of little importance, the spools having always the same location with reference to the magnetic head regardless of the magazine. Spring arms 77 may be provided with hardened steel bosses 86 to keep the spools in proper position by bearing against the flat central core surface 87 of the spools. Fig. 6 shows fragmentarily the rear pulleys 72 over which the wire 33 is compelled to travel as it is directed onto or carried away from the spools. The wire guide shoes 69 and 70 are shown in fragmentary section, as is the central guide frame leg 65.

In Fig. 7 is illustrated a section taken along the line 7—7 of Fig. 3, partially broken away to show the locking mechanism which retains the spools in a fixed position when the magazine is not engaged with the recorder, but which releases them as soon as such engagement is complete. The under sides of spools 74 and 75 have a plurality of recesses 90 formed therein in a circle, outside of frusto-conical recesses 44 and 45. The base plate 36 of the magazine is provided with two spring holders 91 bridging the apertures 93 close to their inner ends. The apertures 93 extend lengthwise of base plate 36 to points underlying the spools 74 and 75 directly beneath the circumference of the circle of recesses 90. A spring locking member 92, accommodated in the apertures 93, passes under the spring holders 91 and over the bore 94. A spool lock releasing pin 95, fixed in the top chassis plate 17 of the recorder, extends up through the bore 94 when the magazine is locked in place on the recorder. Pin 95 is shown in Fig. 7 engaging the central portion of the spring member 92. The spring holders 91 act as fulcra for the two halves of the spring member 92, so that when pin 95 bears upwardly against the central portion of spring 92 as the magazine is locked in place on the recorder, the outer spring ends are forced downward and out of engagement with the recesses 90 in the spools. When the magazine is removed from the recorder unit, withdrawal of pin 95 permits the central portion of the spring 92 to return to its normal straight position, as indicated in Fig. 8. The outer ends then spring upwardly into locking engagement with the recesses 90. This automatic operation insures that the wire on the spools will not be permitted to unwind or over-run when the magazine is removed from the recorder unit. The engagement of the ends of spring 92 with the recesses 90 will not cause the spools to become unseated from their races because of the superior pressure exerted through bosses 86 by the spring arms 77, which hold the spools against the bottom of the races 76 as shown in Fig. 8, except during operative engagement with the recorder.

The details of the cooperative relation between the cam follower 102 and cam 66 which acts to oscillate the W-shaped frame 64, are shown in Fig. 9. Pivots 61 and 62 are arranged to support the W-shaped frame member 64 and to permit oscillation thereof about the common axis of pivots 61 and 62, which is substantially coincident with the path to be followed by the wire 33 between the two pulleys 71 through the space in which it engages the magnetic head.

As seen in Fig. 10, front pulleys 71 are so positioned in the shoes 69 and 70 that the wire 33 will be coincident with the axis of pivots 61 and 62 in passing between pulleys 71. This insures that, regardless of the position of the frame 64, the wire will occupy the same position with respect to the base plate 36, and hence will maintain a constant relation to the magnetic head elements.

Within the central leg 65 of the W-shaped frame 64, as seen in Fig. 9, a bore 100 is arranged to receive a spring 101 and a cam follower 102 on which is formed a cam-engaging shoe 104. Shoe 104 is held in contact with the cam 66 at all times by the spring 101 to insure that the cam follower will track with the double threaded cam, in whichever direction the cam is rotated by the driving mechanism. Beneath cam 66, the base plate 36 is recessed at 105 to provide for the engagement of the cam driving pin 35 with the castellated driving head 31. Fig. 9 also indicates the relation of the recording head unit 15 and its container 16 to the magazine.

In manufacturing magazines in accordance with the invention, three magazine sizes or capacities have been found to be desirable; one for recording approximately fifteen minutes, one for approximately thirty minutes and one for approximately an hour. These sizes differ in interior construction only in having spools of varying axial length and in the provision of cam member 66 of dimensions suitable to wind the wire smoothly onto spools of such different axial lengths. Externally the magazines differ only in thickness. This simplifies the storage and handling of the magazines, and combines with the other improvements described above to produce a more useful recorder. These improvements include, in summary, the elimination from the magazine of shafts or bearings for the support of the spools, and the provision of a simple structure which insures the even winding of the wire on the spools while at the same time passing the wire always through a fixed path for engagement with the magnetic head, so that all magazines are at all times instantly interchangeable and emplaceable on the recorder, regardless of their size, of the proportion of the wire on either spool, and of the position of the level-winding mechanism.

It is to be understood that the exact details of the embodiment shown are exemplary only of the principles of the invention, and that such equivalent means and arrangements of the elements as may be found desirable are intended to be included within the scope of the claims.

I claim:

1. A separable recording wire magazine for use with an electromagnetic recording and reproducing apparatus providing spool-positioning and driving means, said magazine comprising a casing, a pair of spools in relatively unfixed relation arranged within said casing, spring means engaging said spools against rotation thereof when said magazine is separated from said apparatus, recesses formed within said spools adapted to receive said spool-positioning and driving means whereby said spools may be exactly positioned within said magazine for rotation therein, a paramagnetic wire recording medium extending between said spools and adapted to be wound thereon, a resilient W-shaped wire guide frame pivotally mounted in said magazine about an axis perpendicular to the axes of said spools, a cam follower affixed to the central limb of said frame, a rotatable cam arranged on said casing, said cam follower being adapted to engage said cam and to effect oscillation of said frame upon rotation of said cam, and wire guiding means on said frame carrying said wire from one of said spools around both of said spools and back to the second of said spools along a path in part coincident with the pivotal mounting axes of said guide frame.

2. In a magnetic recorder having a magnetic head and spool-positioning and driving means extending therefrom, a separable magazine adapted to be interchangeably associated with said recorder, said magazine comprising a casing, two spools in relatively unfixed relation arranged within said casing and approximately positioned for rotation, a paramagnetic wire wound on and extending between said spools, a head-receiving aperture formed in said magazine to permit ready engagement of said head with said wire within said casing upon the passage of said wire between said spools, apertures formed in said magazine adapted to receive said spool-positioning and driving means whereby said spools may be exactly positioned for and during rotation, guide means comprising a cam rotatably mounted in said casing and a resilient W-shaped frame governed in motion by said cam for laying said wire evenly on said spools during rotation thereof, means for passing said wire upon its passage between said spools in a fixed preferred path relative to said head-receiving aperture independently of the position of said guide means, including pivotal supports for said W-shaped frame mounted on said casing with their pivotal axes substantially coincident with said fixed preferred path, and wire-supporting means spaced in said guide means to deliver said wire substantially coincident with the axes of said pivotal supports.

3. In a magazine containing a paramagnetic wire recording medium for exposure to magnetic recording, play-back, and erasing elements in an associated magnetic recorder by passage from one to the other of two spools in said magazine, means to insure the level winding of said wire on said spools and to carry said wire along a path fixed with reference to said magazine in the passage of said wire from one to the other of said spools during recording, play-back and erasing, comprising a resilient W-shaped wire guiding frame pivotally mounted in said magazine for oscillation about an axis perpendicular to the axes of said spools and parallel to the base of the W, said frame substantially surrounding said spools, a cam follower affixed to said frame, a cam bearing a continuous left- and right-handed thread closed upon itself mounted in said magazine for engagement with said cam follower so as to cause said frame to oscillate, and guide shoes formed upon said frame and guiding said wire from one of said spools around said first spool, along a path coincident with said pivotal axis, around the second of said spools and back onto the second of said spools.

4. A magazine for a magnetic recorder including a casing, supply and take-up spools disposed in said casing for rotation about axes which are parallel but undefined by the structure of said magazine, a paramagnetic wire wound on and extending between said spools, guide means arranged to direct said wire from one of said spools to the other of said spools, said guide means comprising a resilient W-shaped frame pivotally mounted in said magazine about an axis normal to the axes of rotation of said spools and passing through the base of the W, guide pulleys disposed in said frame over which said wire may be trained for passage from one to the other of said spools through a path substantially coincident with the pivotal axis of said frame, and means for rocking said frame about the pivotal axis for laying said wire evenly on said spools.

5. In a magazine for a wire recording medium including a casing and two side-by-side disposed reels for the support of the wire, means to guide the wire in its passage from one reel to the other along a path fixed with reference to the casing and to produce a level winding of the wire on the reels, said means comprising a resilient W-shaped guide frame having two lateral limbs and a central limb, said guide frame being pivotally mounted in the casing for oscillation about an axis substantially coincident with the base of the W, guide means arranged at the four external corners of the frame for the guidance of the wire from one reel onto the frame at the end of one outer leg thereof, over a path substantially coincident with the said axis, out to the end of the other outer leg of the frame and onto the other reel, a cam follower arranged on the central limb of the frame, and a cam rotatably mounted in the casing for engagement with the cam follower.

6. In a magazine for a wire recording medium including a casing and two side-by-side disposed reels for the support of the wire, a level winding guide frame adapted to wind the wire in level layers on the reels and to lead the wire in its passage from one reel to the other through a path fixed with reference to the casing, said frame comprising a resilient W-shaped member having pivots arranged at the base of the W for cooperation with pivot bearings affixed to the casing, guide pulleys disposed at the four corners of the W-shaped member, and a cam follower arranged on the central leg of the W-shaped member for cooperation with a cam mounted in the casing, the base of the W-shaped member having substantial resilience under stresses imposed by the wire.

7. In a magazine for a wire recording medium including a casing and two side-by-side disposed reels for the support of the wire, a guide frame pivotally mounted in the casing for oscillation about an axis perpendicular to the axis of the reels and adapted to lay the wire on the reels in level layers, said guide frame comprising two lateral limbs and a central limb, wire guiding means arranged at each end of each of the lateral limbs, a cam follower arranged on the central limb, a resilient base connecting the limbs together along one end of each thereof, and pivots at each end of said base substantially aligned with said base.

HERMAN NYGAARD.

REFERENCES CITED

The following references are of record in the file of this patent:

UNITED STATES PATENTS

| Number | Name | Date |
|---|---|---|
| 1,665,784 | Hornauer | Apr. 10, 1928 |
| 1,826,758 | Field | Oct. 13, 1931 |
| 1,834,749 | Traxel | Dec. 1, 1931 |
| 1,871,233 | Proctor | Aug. 9, 1932 |
| 2,401,632 | Greenleaf | June 4, 1946 |
| 2,409,942 | Knapp | Oct. 22, 1946 |
| 2,468,198 | Heller | Apr. 26, 1949 |
| 2,490,053 | Harm | Dec. 6, 1949 |